July 3, 1928.  
D. E. SHARP  
1,675,431  
LIGHT TRANSMITTING AND REFLECTING DEVICE  
Filed April 18, 1925

INVENTOR.  
Donald E. Sharp,  
by Parker & Prochnow  
ATTORNEYS.

Patented July 3, 1928.

1,675,431

UNITED STATES PATENT OFFICE.

DONALD E. SHARP, OF HAMBURG, NEW YORK, ASSIGNOR TO SPENCER LENS COMPANY, OF BUFFALO, NEW YORK.

LIGHT TRANSMITTING AND REFLECTING DEVICE.

Application filed April 18, 1925. Serial No. 24,111.

This invention relates to articles made of glass or other transparent material, which are formed in such a manner that the articles have the properties of both transmitting and reflecting light.

Glass or other transparent articles of this kind have heretofore been made by silvering portions of one face of the article so that portions of the articles transmit light and other portions reflect light. These articles, however, are too expensive to be generally used. Such articles have also been so made that one or both sides of an article are provided with a plurality of prismatic projections which effectively reflect light, but these projections seriously interfere with the transmission of the light therethrough. Also the making of dies for molding glass of this kind is expensive.
The objects of this invention are to provide a transparent or glass article or plate which has portions of its surface formed to transmit light and other portions formed to reflect light, so that neither of these portions will interfere with the action of the other portion; also to provide a transparent or glass article or plate which can be made by means of dies or molds which are inexpensive to make and keep in condition for use; also to improve the construction of glass articles of this kind in other respects hereinafter specified.

In the accompanying drawings:—

Figure 4:
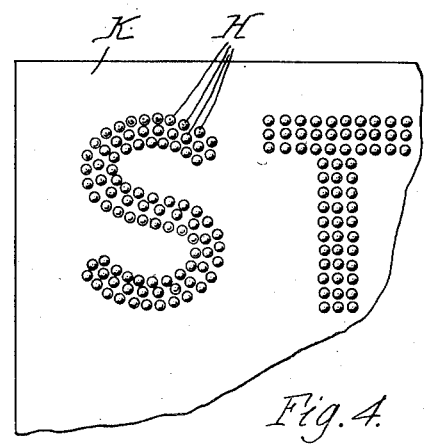
Figures 5, 6:
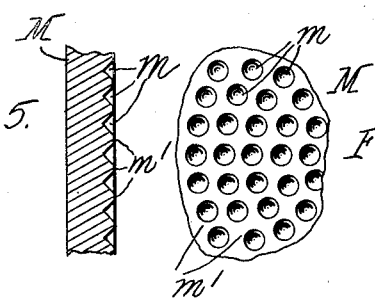

Fig. 4 is a fragmentary face view of a glass article or plate constructed in accordance with the invention, and Figs. 5 and 6 are sectional and front elevations, respectively, of a die which may be employed.
Briefly stated, the invention includes the provision on one or both faces of a glass object, such for example as a plate or lens, of a plurality of substantially conical projections, which projections serve to reflect light passing to the glass object, and the provision between the conical projections of faces through which light may pass substantially without reflection.

Figure 1:
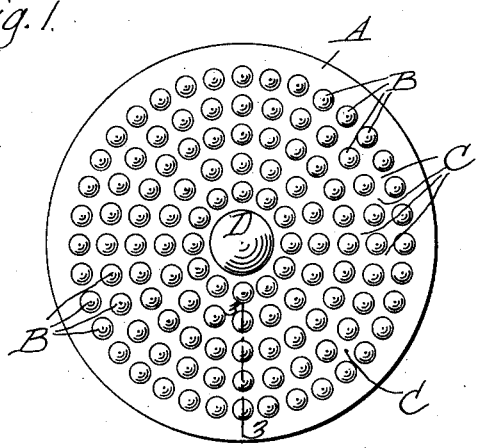
Fig. 1 is a rear face view of a transparent light transmitting and reflecting article, in the form of a tail light lens, embodying my invention.
Figure 2:
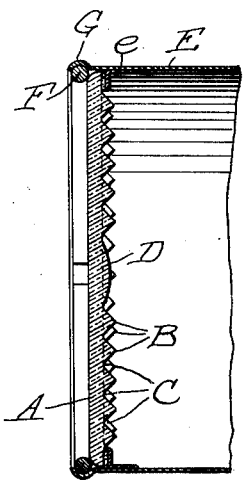
Fig. 2 is a fragmentary central sectional elevation of a tail light having the lens shown in Fig. 1 in place therein.
Figure 3:
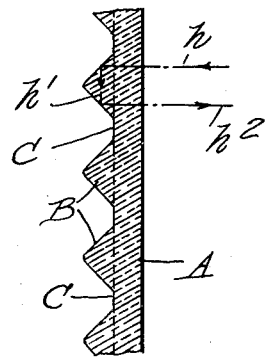
Fig. 3 is a fragmentary transverse sectional view, on an enlarged scale on line 3—3, Fig. 1.

Figs. 1, 2 and 3 show the invention as applied to a lens or glass plate adapted to be used in connection with a source of light arranged at one side of the lens or glass plate. In these figures, A represents the glass plate, lens or other article which may, for example, be made of red glass and adapted for use in connection with the tail light of an automobile or other signal light. B represents a series of conical projections arranged on a face of the lens or other glass object and which may be spaced in any desired manner on the same. In the construction illustrated, these conical projections are spaced apart, leaving substantially flat portions C through which light may pass without obstruction and substantially without reflection. The conical portions B are preferably made in the form of right angled cones, which have the property of reflecting light passing to the lens or article A, in such a manner that the reflected light will return substantially in the direction in which the light passes to the lens or article. In the particular construction shown, the central portion of the lens is provided with a curved face D on one side thereof so that the light from the lamp of the tail light is slightly refracted, and therefore can be clearly seen from different angles.

In Fig. 2, the lens is shown applied to a tail light having the usual housing E, provided with an annular stop shoulder e against which the lens A may be held by any suitable means, such for example as an expansible ring F engaging the edges of the outer face of the lens and arranged in an annular groove G in the outer end of the housing E. Other means for holding the lens in place on the tail light may, of course, be employed. The conical projections in the particular construction shown are arranged on the inner face of the lens, and the outer face thereof is made substantially smooth so that this face, which is exposed to dust and dirt, can be readily cleaned.

In the use of a lens of this kind, when the light or lamp inside of the tail light is lighted, the rays of light passing to the unbroken surface of the lens will pass through the lens without obstruction. Rays of light striking the conical projections may pass back toward the source of light after being reflected by the conical portions on the lens, or they may be reflected back into the tail light and again reflected toward the lens by means of the usual reflector (not shown) commonly used in connection with such lights. If on the other hand the light becomes extinguished for any reason, such as by the burning out of the bulb, the head lights of a car in the rear, will cause the tail light to be clearly visible since any rays of light striking the conical projections B will be reflected back in the general direction of the source of the light, thus giving a warning signal in spite of the fact that the source of light in the tail light is extinguished. The conical projections B act substantially in the same manner as a totally reflecting prism in reflecting light. The lines $h$, $h'$ and $h^2$ on Fig. 3 indicate the path of the ray of light reflected back from a source of light in the same general direction as the source of light. If the lens A is made of red glass, the white rays of light from a source of light, such as the headlight of a car in rear, will, after passing through the red glass of the lens A be red in color, since the red glass will absorb all other colors. The lens or glass A is preferably made relatively thin, and the conical projections are made small and relatively large in number, which has the advantage that the rays of light which are reflected pass through a comparatively small amount of glass, so that less light is absorbed by the glass, and the device is more efficient as a reflecting signal than when larger cones or prisms and thicker glass plates are used.

In Fig. 4 is illustrated another use of my invention, in which the invention is applied to a transparent or glass plate adapted to be used as a sign or signal, for example, at a turn on a road, or in any other position where the plate may be illuminated by the head light of an automobile. In this case, K represents a plate of glass or other transparent material provided on one side thereof with a series of conical projections H which are preferably arranged in such a manner as to form letters or other symbols. For example, in this construction, red glass may also be used, and the conical projections H may be arranged in such a manner as to form the letters Stop or other signal warning the driver of a car, train or other vehicle. When the head light of a car or vehicle strikes the plate K, those rays of light which strike the conical projections H will be reflected back toward the source of light, so that the driver of a car can readily see the letters or symbol formed by the projections H. It will of course be understood that the article may be made of plain colorless glass and that other means for producing colored reflected rays may be employed, such, for example, as a colored filter arranged so that light must pass through the filter before it is reflected back to the source of light.

One of the main advantages of the use of conical projections on a transparent article, in place of prismatic projections, or projections of other shapes, is that the dies necessary for the formation of such articles are very much less expensive to produce and to keep in condition for use. For example, when a glass plate or lens is provided on one or both sides with prismatic projections which are intended to reflect light back approximately to the source of light, such prisms must be cut in the dies by hand and must be made accurately for the reason that right angle prisms are necessary to reflect rays of light back to the source of light. Furthermore, as has already been explained, the transparent articles will act much more efficiently if the article is made comparatively thin and the cones or reflecting projections thereon are made of small size and when prisms are used, this is practically impossible owing to the difficulty of cutting the small prisms by hand in such a manner that the faces are accurately positioned relatively to each other so as to form right angled prisms.

As shown in Figs. 5 and 6, the dies which are used when articles of the kind described are made of glass in accordance with my invention, are extremely simple to make for the reason that the recesses or depressions in the die which form the cones are very readily made by use of a milling cutter or by turning on a lathe and by having the drilling or milling tool cut in such a manner as to form right angled cones, a die can be very quickly made by a comparatively inexperienced mechanic for the reason that no accurate hand work is required, it being merely necessary to make a series of holes $m$ in a die M, and to position these holes in any desired manner to produce the desired arrangement of the cones on a transparent article.

The molds or dies used in the molding of glass must be cleaned with a fine carborundum stone or other abrasive at very frequent intervals in order to maintain a smooth surface on the metal and thereby give a smooth surface to the glass. It is very difficult to clean and polish the flat surfaces and the sharp corners of a die for molding glass with prismatic faces, so that such dies are not only expensive to produce but also difficult to maintain in condition for successful use. In the case of the dies for use in connection with the molding of my improved transparent articles, the dies can be very easily cleaned since the flat faces $m'$ of the die are very readily accessible and afford no difficulty whatever, and the conical depressions in the die can be easily cleaned by means of a pointed carborundum stick, the end of which is in the shape of a right angle cone. This carborundum stick may be rotated in the hollow or depression m by means of a hand drill or other suitable rotary device, so that the cleaning of the die may be very quickly and thoroughly accomplished with the minimum expenditure of time. Consequently, by reducing the cost of the dies necessary for the production of the transparent articles, the cost of the articles themselves is accordingly reduced.

I claim as my invention:

1. A signal element of light transmitting material having upon one face thereof a plurality of conical projections, said projections being approximately right cones capable of total reflection of light rays striking the surfaces of the same from within the cones and coming from directions approximately parallel to the axes of the cones, said element including a colored portion between the conical surfaces and the face of said element opposite from that face from which the cones project, whereby white light which enters said element and is totally reflected by said cones will be colored when it emerges, said element also having upon its face from which the cones project, a plurality of relatively flat spaces between the cones for transmitting light without total reflection.

2. A light transmitting signal article of colored glass having a plurality of integral light reflecting right cones projecting from a face thereof and having substantially flat spaces arranged between the cones on the same face.

DONALD E. SHARP.